United States Patent [19]

Savin

[11] Patent Number: 5,182,318
[45] Date of Patent: Jan. 26, 1993

[54] COATING COMPOSITION CONTAINING METAL-COATED MICROSPHERES EXHIBITING IMPROVED RESISTANCE TO ENVIRONMENTAL ATTACK OF METALLIC SUBSTRATES

[76] Inventor: Ronald R. Savin, 10448 Chester Rd., Cincinnati, Ohio 45215

[21] Appl. No.: 639,782

[22] Filed: Jan. 10, 1991

[51] Int. Cl.$^5$ ............................ C08K 7/28; C08K 3/08; C08L 63/02
[52] U.S. Cl. .................................. 523/216; 523/442; 523/458; 523/443; 523/463
[58] Field of Search ............... 523/442, 458, 216, 443, 523/463

[56] References Cited

U.S. PATENT DOCUMENTS

| | | | |
|---|---|---|---|
| 3,725,355 | 4/1973 | Parrish et al. | 260/77.5 AP |
| 3,954,693 | 5/1976 | Fong | 260/37 N |
| 3,998,771 | 12/1976 | Feneis et al. | 260/18 PN |
| 4,130,431 | 12/1978 | Kogure | 523/458 |
| 4,417,007 | 11/1983 | Salensky et al. | 523/442 |
| 4,417,008 | 11/1983 | Salensky et al. | 523/442 |
| 4,621,024 | 11/1986 | Wright | 428/404 |
| 4,748,194 | 5/1988 | Geeck | 523/427 |
| 4,891,394 | 1/1990 | Savin | 523/442 |

FOREIGN PATENT DOCUMENTS 2602239 2/1988 France .

Primary Examiner—John C. Bleutge
Assistant Examiner—Christopher P. Rogers
Attorney, Agent, or Firm—Frost & Jacobs

[57] ABSTRACT

A coating composition for the protection of metallic substrates against environmental attack comprising, in weight percent, from about 10% to about 30% of at least one film-forming polymer such as epoxy resins having an epoxide value of about 250 to about 2500, vinyl chloride resins copolymerized with polyisocyanates, polyurethane resins, and polyester resins; from about 40% to about 55% particulate metallic zinc; from about 4.75% to about 7% zinc-coated hollow glass-like microspheres having diameters ranging from about 2.5 to about 60 microns, the volumetric ratio of the metallic zinc to the microspheres ranging from about 0.8:1 to 1.2:1; from about 1.5 to about 3% of at least one particle size grade of pyrogenic amorphous silica having an average particle size ranging from about 0.007 to about 0.04 micron; and not more than 30% solvents compatible with the film-forming polymer. A dried coating of this composition, having a thickness of at least about 4 mils (about 100 microns), is cathodic and electrically non-conductive.

13 Claims, No Drawings

COATING COMPOSITION CONTAINING METAL-COATED MICROSPHERES EXHIBITING IMPROVED RESISTANCE TO ENVIRONMENTAL ATTACK OF METALLIC SUBSTRATES

BACKGROUND OF THE INVENTION

1. Field Of The Invention

This invention relates to a coating composition which provides improved resistance to environmental attack of metallic substrates, by incorporation of metal-coated microspheres which are concentrated at the exposed surface of a dry coating to form an electrically non-conductive barrier, in a metal powder-organic binder composition. The invention has particular utility in the form of a zinc-rich composition containing zinc coated microspheres for deposition on ferrous metal substrates.

2. The Prior Art

Various compositions have been used as protective coatings containing polymers such as phenolic resins, polyesters, polyurethanes, epoxy resins and polyvinyl chloride resins, which also contain metallic chromates or phosphates, metallic oxides and/or zinc in particulate form. Zinc-rich primers have been considered to be optimum anti-corrosion coatings on iron or steel substrates. However, problems have restricted their use as industrial type primers. The action of zinc powder in inhibiting rust is based on an electrochemical interaction between the zinc and the steel substrate. In order not to insulate the zinc particles from each other and from the substrate the prior art has considered it necessary to use very little binder, with satisfactory corrosion protection achieved only when the zinc:binder ratio is at least about 92:8. The high zinc level and the relatively high density of zinc powder often cause undesirable settling during short term storage. Hence, the zinc powder is often added just prior to application and mixed rapidly during application to prevent settling and clogging of spray equipment. This deters efficient field use.

A low binder content was previously considered to be an advantage since a higher binder level would isolate the metallic grains from each other and from the substrate to be protected, thereby providing ineffective cathodic protection.

A lower zinc content is disclosed in U.S. Pat. No. 3,998,771, issued December, 1976 to T. J. Feneis, Jr. et al, which describes water-based coating compositions for application on iron supports to obtain corrosive coatings. Single phase compositions in this patent include about 2% to 10% by weight of a non-volatile liquid epoxy resin, with low viscosity, derived from bisphenol A and an epihalohydrin, e.g., epichlorohydrin; about 2% to 10% by weight of a modified polyamide, i.e., an addition product of a water soluble polyamide and a liquid epoxy resin; and about 55% to 70% by weight of a zinc-powder pigment having an average particle size of about 2 to 15 microns.

U.S. Pat. No. 4,417,007, issued November, 1983 to G. A. Salensky et al, discloses a one component composition containing from about 4% to 25% by weight epoxy or phenoxy resin binder and a polyamine hardener, about 43% to 90% by weight zinc dust, about 3% to 38% by weight $Mn_3O_4$ fume pigment, up to 35% by weight additional pigments including pigment extenders and fillers (such as talc, clays, diatomaceous silica and silica), up to 5% by weight pigment suspension agent (such as hydrous magnesium silicate and lecithin), and balance organic solvents. A 1:1 volume ratio of zinc dust:$Mn_3O_4$ is preferred.

U.S. Pat. No. 4,891,394, issued January, 1990 to Ronald R. Savin, discloses a coating composition for the protection of metallic and non-metallic substrates against environmental attack, comprising about 10% to about 25% by weight of a film-forming polymer which may be epoxy resins having an epoxide value of about 250 to 2500, vinyl chloride resins copolymerized with polyisocyanates, and/or vinyl chloride resins copolymerized with melamines; about 30% to about 60% by weight particulate metallic zinc; an agent for control of electrical conductive characteristics comprising a crystalline silica having an oil absorption value of less than 20 measured by ASTM Test D281-84, the volumetric ratio of such agent to the metallic zinc ranging from about 0.7:1 to about 1.25:1; about 2% to about 3% by weight of an agent for control of rheological characteristics comprising a pyrogenic amorphous silica having an average particle size less than about 0.012 micron; and at least one solvent compatible with the polymer.

French patent application 2,602,239, published Feb. 19, 1988 in the name of Ronald R. Savin, discloses a two phase coating composition containing up to 70% by weight of a powdered metal (based on the total weight of the composition after admixture), from about 2% to 30% of a film-forming polymer, about 2% to about 30% of a hardener for the polymer, at least 1.8% to 30% of an agent for control of rheological characteristics, and up to 30% by weight organic solvents. The preferred polymer is an epoxy resin having an average molecular weight of 350 to 3800. The agent for control of rheological characteristics comprises at least one pyrogenic silica and optionally at least one natural or transformation silica having an oil absorption value preferably not greater than 90 and more preferably not greater than 40. In the specific examples, pyrogenic silicas were used having average particle sizes of about 0.014 micron, about 0.007 micron and about 0.008 micron, respectively.

U.S. Pat. No. 4,748,194, issued May, 1987 to Geeck, discloses a coating composition for the protection of gas tanks, comprising a powder metal (such as zinc, cadmium, stainless steel, aluminum, alloys or mixtures thereof), a linear epoxy or phenoxy resin having a molecular weight of less than 15,000 cross-linked with a blocked isocyanate, a suspension agent, a thixotropic agent, and "active" and "inactive" organic solvents. The powdered metal ranges from 13 to 52 parts per hundred. The solids content of these compositions is far below federal and state regulations for volatile organic content. The suspension agent disclosed in this patent is polyethylene, and the thixotropic agent is silane treated silica dioxide, in amounts up to 2 parts per hundred.

U.S. Pat. No. 4,621,024, issued Nov. 4, 1986 to F. A. Wright, discloses metal coated microspheres and a process for preparation thereof. Particulate zinc, aluminum, silver, copper, stainless steel, platinum, gold, or mixtures thereof, having an average particle size of about 6 to 10 microns, are bonded to the surfaces of non-conductive microspheres by means of a thermosetting adhesive coating on the microspheres with application of heat, followed by intermittent mixing in the absence of heat. The microspheres may be fly ash, comprising about 80%-96% by weight alumina-silica, with minor amounts of iron oxide, alkaline earth metal oxides and alkali metal oxides The adhesive binder preferably comprises an organo functional silane and a copolymerizable monomer. In the final product the metal is from about 15% to about 30% by weight, relative to the weight of the adhesive binder-coated microspheres. Although this patent discloses average particle size diameters of metal coated microspheres ranging from about 60 to 180 microns, the assignee also produces zinc coated microspheres of smaller average diameters, e.g., about 2.5 to about 60 microns.

The use of zinc-coated microspheres disclosed in the above mentioned U.S. Pat. No. 4,621,024 in zinc-rich inorganic binder compositions has been proposed by the prior art, as a partial replacement for zinc dust. More specifically, substitution of 20% and 40% by volume of zinc-coated microspheres in place of zinc dust in a silicate primer (produced by Carboline Company of St. Louis, Mo., under the trademark "Carbo Zinc 11") has been evaluated. Silicate binders of this type have a very slow drying time, and also require blast cleaning of the metal substrate prior to deposition of the coating. Moreover, such coatings are electrically conductive. Hence such inorganic binder compositions are unsuitable for many industrial applications, such as moving production lines and applying coatings in the field under ambient climatic conditions.

While the above-mentioned patents have provided coatings for metallic or non-metallic substrates which have substantially improved the useful life of the substrates, it has been found that even the best coatings proposed in the prior art exhibit disadvantages which are manifested by blisters, separation from the substrate to be protected, poor adhesion and/or premature corrosion.

It is an object of the present invention to provide coating compositions for the protection of metallic substrates which avoid the disadvantages of prior art compositions as outlined above.

A further object is the provision of a zinc-based coating composition of relatively low density or specific gravity which can be readily applied over untreated metal substrates by means of all conventional application equipment while at the same time meeting all current environmental regulations regarding solvent emissions for volatile organic compounds.

Still another object of the invention is the provision of an electrically non-conductive coating for a ferrous metal substrate providing cathodic protection to the substrate, wherein zinc-coated microspheres are concentrated at the exposed surface of the coating while powdered zinc is concentrated adjacent the substrate, with a polymeric film providing substantially complete impermeability against the penetration of moisture, water vapor or saltspray vapor.

SUMMARY OF THE INVENTION

The above and other objects are provided in a coating composition for the protection of metallic substrates against environmental attack comprising, in weight percent based on the total weight of the composition:

from about 10% to about 30% of at least one film-forming polymer selected from the group consisting of epoxy resins having an epoxide value of about 250 to 2500, vinyl chloride resins copolymerized with polyisocyanates, polyurethane resins, polyester resins, and mixtures thereof;

from about 40% to about 55% particulate metallic zinc;

from about 4.75% to about 7% zinc-coated hollow glass-like microspheres having diameters ranging from about 2.5 to about 60 microns, the volumetric ratio of particulate zinc to the microspheres ranging from about 0.8:1 to 1.2:1;

from about 1.5% to about 3% of at least one size grade of a pyrogenic amorphous silica having an average particle size ranging from about 0.007 to about 0.04 micron;

not more than 30% solvents compatible with the film-forming polymer or polymers.

In accordance with the invention there is also provided an electrically non-conductive coating for a ferrous metal substrate providing cathodic protection to the substrate, the coating having a dry thickness of at least about 4 mils (about 100 microns) and comprising, in weight percent:

from about 13% to about 40% of at least one polymeric film selected from the group consisting of epoxy resins having an epoxide value of about 250 to 2500, vinyl chloride resins copolymerized with polyisocyanates, polyurethane resins, polyester resins, and mixtures thereof;

from about 52% to about 78% particulate metallic zinc;

from about 6% to about 9.5% zinc-coated hollow glass-like microspheres having diameters ranging from about 2.5 to about 60 microns, the volumetric ratio of particulate zinc to the microspheres ranging from about 0.8:1 to about 1.2:1; and from about 2% to about 4.5% of at least one size grade of a pyrogenic amorphous silica having an average particle size ranging from about 0.007 to about 0.04 micron; wherein the microspheres are concentrated at the exposed surface of the coating remote from the substrate, and the particulate zinc is concentrated adjacent the substrate.

Preferably the particulate zinc has an average particle size of about 2 to 15 microns and a bulk density of about 7.1 grams per cubic centimeter.

The solvents are selected from the group consisting of ketones, alcohols, esters, aromatic organic compounds, and mixtures thereof. The total weight of solvents meets current governmental regulations relating to volatile organic compounds (VOC).

DETAILED DESCRIPTION OF THE INVENTION

A unique feature of the present invention is the formation of a dried electrically non-conductive coating on a ferrous metal substrate which provides cathodic protection, wherein zinc-coated microspheres are concentrated at the exposed surface of the coating, and the particulate zinc is concentrated adjacent the substrate, as indicated above. In order to achieve this partial separation of components, the solvent blend is so selected that the composition will remain fluid after application for a period of time sufficient to permit the low density zinc-coated hollow microspheres to float to the surface of the coating while the relatively high density zinc particles settle adjacent the substrate. Ordinarily, a time period of about 15 minutes is sufficient for this purpose.

Zinc-coated hollow microspheres having an average diameter of about 2.5 to about 60 microns are preferred in the practice of the invention. Such a product is sold by The PQ Corporation under the trademark "Metalite"—Zinc SF. It has a bulk density of about 0.85 gram per cubic centimeter, i.e., about 0.119 times the bulk density of the powdered zinc. As indicated in the above description of U.S. Pat. No. 4,621,024 the glass-like microspheres may be fly ash, which comprise about 80% to 96% by weight alumina-silica, with small amounts of iron oxide, alkaline earth metal oxides and alkali metal oxides. The zinc coating ranges from about 15% to about 30% by weight, relative to the weight of the adhesive binder-coated microspheres.

Preferred film-forming polymers for use in the coating of the invention include an epoxy resin having an epoxide value of about 450 to about 1500, a polyvinyl chloride resin and a polyisocyanate copolymerizable therewith, or a linear epoxy resin.

The presence of at least about 1.5% by weight, based on the total weight of the composition, of one or more pyrogenic amorphous silicas, having an average particle size ranging from about 0.007 to about 0.04 micron is essential to impart resistance against moisture, water vapor and saltspray vapor. Preferably at least two particle size grades are used. Such silicas are produced from specific treatments such as high temperature hydrolysis of silicon tetrachloride or from transformation of silica in an electric arc. Preferred pyrogenic silicas include those sold under the trademark "AEROSIL" by Degussa, and the trademark "CABOSIL" by Cabot Corporation. Suitable size grades include "AEROSIL" 300 having an average particle size of about 0.007 micron and "AEROSIL" 972 having an average particle size of about 0.018 micron. "AEROSIL" 972 is silane treated. Other size grades sold under the trademark "AEROSIL" range from about 0.008 to about 0.04 micron in average particle size, some of which are silane-treated.

A minimum of about 40% by weight zinc dust, based on the total weight of the composition, is essential, in combination with a volumetric ratio of zinc dust to the microspheres of at least about 0.8:1 and preferably 1:1.

When applied at a dry coating thickness of at least about 4 mils the composition forms a coating which provides immediate cathodic protection but which is not electrically conductive. This non-conductivity is important for long-term corrosion protection particularly in the case of metallic structures which are grounded. It is believed that non-conductivity is imparted by the polymer film between the zinc dust on the substrate and the microspheres at the exposed surface. The zinc-coated hollow microspheres concentrated at the exposed surface of the coating quickly form a zinc oxide surface layer generally referred to as white rust. This is not undesirable and actually is beneficial in providing an extra barrier coat against corrosion.

Since some of the zinc-coated microspheres have diameters as great as 60 microns, it is important that the dry thickness of the applied coating be at least about 100 microns (4 mils) in order that all the microspheres be suspended in the polymeric binder film adjacent the exposed face of the coating and out of contact with the substrate.

It should be recognized that primer coatings produced with the composition of the present invention are somewhat rough and irregular in surface appearance and hence are not suitable for applications which require a smooth and glossy final surface for exposed parts. However, many other applications in which coatings of the invention have outstanding utility as primers include, without limitation, bridges, off-shore oil drilling platforms, guard rails, storage tanks, and structural metallic frames. In addition to highly effective long-term corrosion protection, coatings of the invention exhibit high flexibility and high impact strength. In this connection, it is noted that the hollow microspheres can withstand about 2000 psi compression or crushing force and hence do not rupture readily. Even if abraded, only the top portions of the microspheres in the coating are removed, leaving a sufficient portion thereof to reform a white rust barrier coat.

Compositions in accordance with the invention can be prepared either as single component or two component types, depending upon the resin which is used as a binder. The method of preparation includes simple mixing of the various components, with the microspheres preferably being added last and incorporated uniformly in the mixture without strong shearing action.

When an epoxy resin is used as the binder, conventional drying or hardening agents for the resin may be included, such as organic salts of cobalt, zirconium and calcium, in a total amount up to about 1% by weight. Alternatively, hardening agents such as polyamines or polyamides may be used, in amounts up to about the percentage of the epoxy resin.

Preferably zeolite molecular sieves are also incorporated in the composition in amounts up to about 0.5% by weight.

As is well known, epoxy resins are the reaction product of an epihalohydrin and a polyol. Hardening or crosslinking agents for epoxy resins include at least one compound with an $-NH_2$, $-CONH_2$, $-NHR$, $-CONHR$, and/or $-COOH$ functional group, which reacts with the epoxy function. The preparation of epoxy resins and crosslinking reactions are described in U.S. Pat. No. 3,954,693, issued May, 1976 to C. C. Fong, the disclosure of which is incorporated by reference. Epoxy resins suitable for use in the present invention include those produced by Shell Chemical Company under the trademarks "Shell 1123" and "Shell 828", and by Ciba-Geigy Co. under the trademark "488-60 Epoxy". Other equivalent epoxy resins are commercially available.

Polyvinyl chloride resins are commercially available, such as that sold under the trademark "UCAR-VYES" by Union Carbide Corporation. Such a resin is copolymerizable with an isocyanate.

Urethane polymers are produced by reaction of a polyisocyanate with a polyol, as taught in U.S. Pat. No. 3,725,355, issued April, 1973 to D. B. Parrish et al, the disclosure of which is incorporated by reference.

Coatings of the present invention can be applied in any conventional manner such as spraying, dipping, flowcoating and rollercoating. The coatings are dry to the touch after about 30 minutes under ordinary conditions, and can be recoated thereafter.

A preferred single phase composition in accordance with the invention comprises, in weight percent based on the total weight of the composition:

from about 18% to about 25% of an epoxy resin having an epoxide value of about 450 to 1500;

from about 40% to about 45% particulate metallic zinc having an average particle size of about 2 to 15 microns;

from about 5% to about 6% zinc-coated hollow alumina-silica microspheres having diameters ranging from about 2.5 to about 60 microns, the volumetric ratio of the particulate zinc to the microspheres being about 1:1;

from about 2% to about 3% of a mixture of two particle size grades of pyrogenic amorphous silicas having average particle sizes of about 0.007 and about 0.018 micron, respectively;

from about 0.3% to about 0.5% zeolite molecular sieves;

from about 0.5% to about 0.7% organo-metallic salt dryers for the epoxy resin; and from about 25% to about 30% methylethylketone and methylamylketone as solvents.

A preferred two phase composition of the invention comprises, in weight percent based on the total weight of the composition after admixture:

from about 13% to about 15% of a polyvinyl chloride resin;

about 0.5% to about 1% of a linear epoxy resin;

from about 48% to about 52% particulate metallic zinc having an average particle size of about 2 to 15 microns;

from about 5.5% to about 6.25% zinc-coated hollow alumina-silica microspheres having diameters ranging from about 2.5 to about 60 microns, the volumetric ratio of the particulate zinc to the microspheres being about 1:1;

from about 1.8% to about 2.5% of a mixture of two particle size grades of pyrogenic amorphous silicas having average particle sizes of about 0.007 and about 0.018 micron, respectively;

from about 0.3% to about 0.4% zeolite molecular sieves;

from about 2.8% to about 3% of a polyisocyanate copolymerizable with the vinyl chloride resin; and from about 25% to about 30% methylethylketone and methylamylketone as solvents for the resins.

Another preferred single phase composition of the invention comprises, in weight percent based on the total weight of the composition:

from about 25% to about 30% of a linear epoxy resin;

from about 42% to about 45% particulate metallic zinc having an average particle size of about 2 to 15 microns;

from about 5% to about 5.5% zinc-coated hollow alumina-silica microspheres having diameters ranging from about 2.5 to about 60 microns, the volumetric ratio of the particulate zinc to the microspheres being about 1:1;

from about 1.5% to about 2% of a mixture of two particle size grades of pyrogenic amorphous silicas having average particle sizes of about 0.007 and about 0.0018 micron, respectively;

from about 0.3% to about 0.4% zeolite molecular sieves; and from about 25% to about 30% of ketones and esters as solvents for the epoxy resin.

The following specific examples are given to illustrate preferred embodiments of compositions of the invention but are not to be construed as limitations on the invention herein claimed.

EXAMPLE 1

A single component coating composition was prepared by mixing the constituents listed below with the microspheres being added last. The quantities are in percent by weight based on the total weight:

| | |
|---|---|
| Epoxy polymer[1] | 19.04% |
| Zinc dust[2] | 42.87 |
| Amorphous silica (0.007 micron)[3] | 1.46 |
| Amorphous silica (0.018 micron)[4] | 0.73 |
| Dryer (Cobalt 12%) | 0.09 |
| Dryer (Zirconium 8%) | 0.39 |
| Dryer (Calcium 6%) | 0.09 |

-continued

| | |
|---|---|
| Zinc-coated microspheres[5] | 5.06 |
| Zeolite molecular sieves | 0.43 |
| Methylethylketone | 23.87 |
| Methylamylketone | 5.97 |
| | 100.00% |

[1]Shell Chemical Co. TM "Shell 1123" epoxy ester
[2]N.J. Zinc Co. #64; particle size 2-15 microns.
[3]Degussa TM "Aerosil" 300 pyrogenic silica.
[4]Degussa TM "Aerosil" 972 - silane treated pyrogenic silica.
[5]PQ Corporation TM "Metalite" - Zinc SF; particle size 2.5-60 microns.

EXAMPLE 2

A two component coating composition was prepared by separately mixing the constituents set forth below in Phase A and Phase B respectively, with the quantitites being expressed in percent by weight based on the total weight after admixture of the two phases:

| PHASE A | |
|---|---|
| Polyvinyl chloride[1] | 13.18% |
| Epoxy polymer[2] | 0.66 |
| Zinc dust[3] | 49.40 |
| Amorphous silica (0.007 micron)[4] | 1.32 |
| Amorphous silica (0.018 micron)[5] | 0.66 |
| Zinc-coated microspheres[6] | 5.93 |
| Zeolite molecular sieves | 0.33 |
| Methylethylketone | 11.70 |
| Methylamylketone | 11.69 |
| PHASE B | |
| Isocyanate[7] | 2.93 |
| Methylamylketone | 2.20 |
| | 100.00% |

[1]Union Carbide TM "UCAR VYES".
[2]Shell Chemical Co. TM "Shell 828" liquid epoxy
[3]N.J. Zinc Co. #64; particle size 2-15 microns.
[4]Degussa TM "Aerosil" 300 pyrogenic silica.
[5]Degussa TM "Aerosil 972 silane treated pyrogenic silica.
[6]PQ Corporation TM "Metalite" - zinc SF; particle size 2.5-60 microns.
[7]Desmodur N-75.

EXAMPLE 3

A single component coating composition was prepared by mixing the constituents listed below with the microspheres being added last. The quantities are in percent by weight based on the total weight:

| | |
|---|---|
| Epoxy polymer[1] | 25.82% |
| Zinc dust[2] | 43.04 |
| Amorphous silica (0.007 micron)[3] | 0.78 |
| Amorphous silica (0.018 micron)[4] | 0.78 |
| Zinc-coated microspheres[5] | 5.09 |
| Zeolite molecular sieves | 0.39 |
| Methylethylketone | 8.04 |
| Primary methyl acetate | 8.03 |
| Dibasic ester | 8.03 |
| | 100.00% |

[1]Ciba-Geigy Co. TM "Epoxy 488-60" linear epoxy
[2]N.J. Zinc Co. #64; particle size 2-15 microns.
[3]Degussa TM "Aerosil" 300 pyrogenic silica.
[4]Degussa TM "Aerosil" 972 silane treated pyrogenic silica.
[5]PQ Corporation TM "Metalite" - Zinc SF; particle size 2.5-60 microns.

Coatings of about 4 mils dried thickness of the compositions of Examples 1, 2 and 3 were deposited on cold rolled steel substrates which were untreated except for degreasing. Properties of these coatings have been determined. All coatings met or exceeded the U.S. Federal Standards 141a with respect to saltspray resistance, adhesion, impact and flexibility, and were superior to commercially available zinc-rich primers.

I claim:

1. A coating composition for the protection of metallic substrates against environmental attack comprising, in weight percent based on the total weight of the composition:
   from about 10% to about 30% of at least one film-forming polymer comprising epoxy resins having an epoxide value of about 250 to about 2500;
   from about 40% to about 55% particulate metallic zinc;
   from about 4.75% to about 7% zinc-coated hollow glass microspheres having diameters ranging from about 2.5 to about 60 microns, the volumetric ratio of said particulate zinc to said microspheres ranging from about 0.8:1 to 1.2:1;
   from about 1.5% to about 3% of least one particle size grade of a pyrogenic amorphous silica having an average particle size ranging from about 0.007 to about 0.004 micron, and
   not more than 30% solvents compatible with said at least one film-forming polymer.

2. The composition of claim 1, wherein said zinc has an average particle size of about 2 to 15 microns and a bulk density of about 7.1 grams per cubic centimeter.

3. The composition of claim 2, wherein the volumetric ratio of said zinc to said microspheres is about 1:1.

4. The composition of claim 1, wherein said film-forming polymer is a linear epoxy resin.

5. The composition of claim 1, wherein said solvents are selected from the group consisting of ketones, alcohols, esters, aromatic organic compounds, and mixtures thereof, in an amount less than 340 grams per liter of said composition.

6. The composition of claim 1, including up to about 1% drying agents for said epoxy resin.

7. The composition of claim 1, including up to about 0.5% zeolite molecular sieves.

8. The composition of claim 1, comprising, in weight percent based on the total weight of the composition:
   from about 18% to about 25% of an epoxy resin having an epoxide value of about 450 to about 1500;
   from about 40% to about 45% particulate metallic zinc having an average particle size of about 2 to 15 microns;
   from about 5% to about 6% zinc-coated alumina-silica microspheres having diameters ranging from about 2.5 to about 60 microns, the volumetric ratio of said particulate zinc to said microspheres being about 1:1;
   from about 2% to about 3% of a mixture of two particle size grades of pyrogenic amorphous silicas having average particle sizes of about 0.007 and about 0.018 micron, respectively;
   from about 0.5% to about 0.7% organo-metallic salt dryers for said epoxy resin; and
   from about 25% to about 30% methylethyl ketone and methylamylketone as solvents.

9. The composition of claim 1, comprising, in weight percent based on the total weight of the composition:
   from about 25% to about 30% of a linear epoxy resin;
   from about 42% to about 45% particulate metallic zinc having an average particle size of about 2 to 15 microns;
   from about 5% to about 5.5% zinc-coated hollow alumina-silica microspheres having diameters ranging from about 2.5 to about 60 microns, the volumetric ratio of said particulate zinc to said microspheres being about 1:1;
   from about 1.5% to about 2% of a mixture of two particle size grades of pyrogenic amorphous silicas having average particle sizes of about 0.007 and about 0.018 micron, respectively;
   from about 0.3% to about 0.4% zeolite molecular sieves; and
   from about 25% to about 30% of ketones and esters as solvents.

10. An electrically non-conductive coating for a ferrous metal substrate providing cathodic protection to said substrate, said coating having a dry thickness of at least about 4 mils (about 100 microns) and comprising, in weight percent:
    from about 13% to about 40% of at least one polymeric film comprising epoxy resins having an epoxide value of about 250 to about 2500;
    from about 52% to about 78% particulate metallic zinc;
    from about 6% to about 9.5% zinc-coated hollow glass microspheres having diameters ranging from about 2.5 to about 60 microns, the volumetric ratio of said particulate zinc to said microspheres ranging from about 0.8:1 to about 1.2:1; and
    from about 2% to about 4.5% of at least one size grade of a pyrogenic amorphous silica having an average particle size ranging from about 0.007 to about 0.04 micron; wherein said microspheres are concentrated at the exposed surface of said coating remote from said substrate, and said particulate zinc is concentrated adjacent said substrate.

11. The coating of claim 10, wherein said zinc has an average particle size of about 2 to 15 microns and a bulk density of about 7.1 grams per cubic centimeter.

12. The coating of claim 11, wherein the volumetric ratio of said zinc to said microspheres is about 1:1.

13. The coating of claim 10, including up to about 0.7% zeolite molecular sieves.

* * * * *

UNITED STATES PATENT AND TRADEMARK OFFICE
CERTIFICATE OF CORRECTION

PATENT NO. : 5,182,318
DATED : January 26, 1993
INVENTOR(S) : Ronald R. Savin

It is certified that error appears in the above—identified patent and that said Letters Patent is hereby corrected as shown below:

Column 9, Claim 1, line 18, "0.004" should be deleted and replaced with --0.04--.

Signed and Sealed this

Seventh Day of December, 1993

Attest:

BRUCE LEHMAN

Attesting Officer   Commissioner of Patents and Trademarks